United States Patent [19]
Roberts et al.

[11] 3,741,134
[45] June 26, 1973

[54] WASTE INCENERATION SYSTEM

[75] Inventors: George C. Roberts, Venice; Donald A. Dotson, Redondo Beach, both of Calif.

[73] Assignee: Monogram Industries, Inc., Los Angeles, Calif.

[22] Filed: Nov. 26, 1971

[21] Appl. No.: 202,234

[52] U.S. Cl. ............... 110/8 R, 110/8 C, 110/18 C
[51] Int. Cl. .............................................. F23g 5/12
[58] Field of Search .................. 110/7 R, 8 R, 8 C, 110/9 R, 9 E, 18 R, 18 C

[56] References Cited
UNITED STATES PATENTS

| | | |
|---|---|---|
| 3,357,381 | 12/1967 | Stevens .................................. 110/9 |
| 3,395,654 | 8/1968 | Weisberg et al. ...................... 110/8 |
| 3,572,265 | 3/1971 | Stockman ............................. 110/18 |
| 3,622,511 | 11/1971 | Pizzo et al. .......................... 110/8 X |

Primary Examiner—Kenneth W. Sprague
Attorney—Leonard Golove, Marvin H. Kleinberg et al.

[57] ABSTRACT

A waste incineration system is disclosed which employs a relatively large flame volume in the burner which substantially occupies the combustion chamber. All vapors and entrained gaseous products spend a relatively long time in contact with the flame. A thermally controlled fuel valve remains open so long as a minimum temperature differential exists between the exhaust flue temperature and the temperature of the container near the base. Initially, the liquid portion of the waste material is vaporized from the surface and the remaining solid waste is burned to ash.

20 Claims, 5 Drawing Figures

PATENTED JUN 26 1973

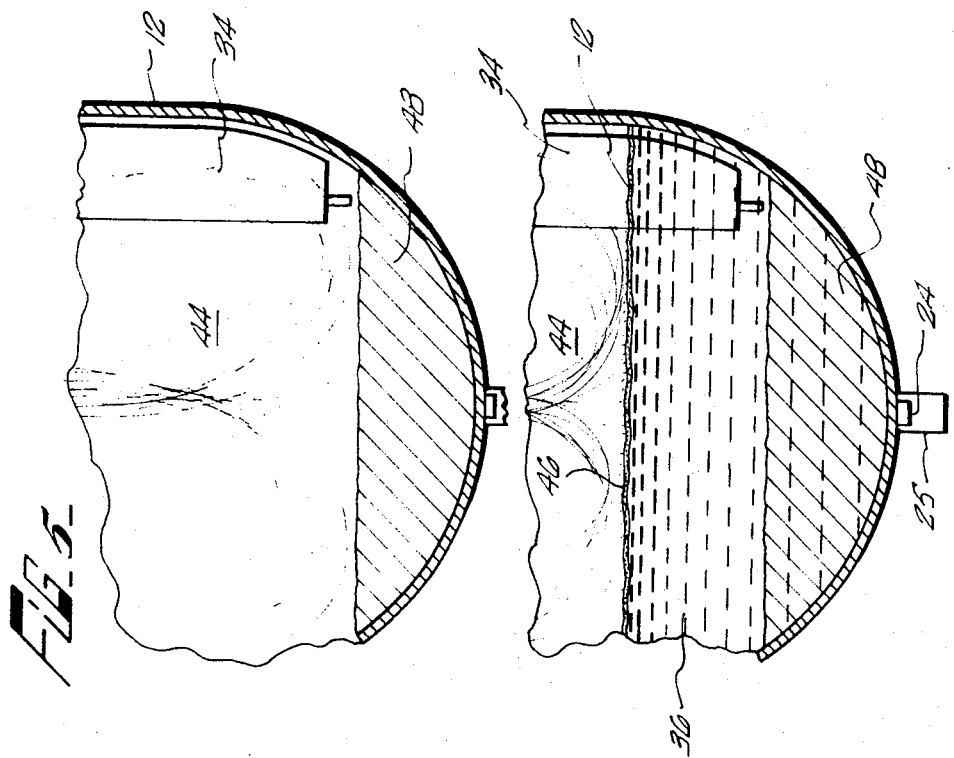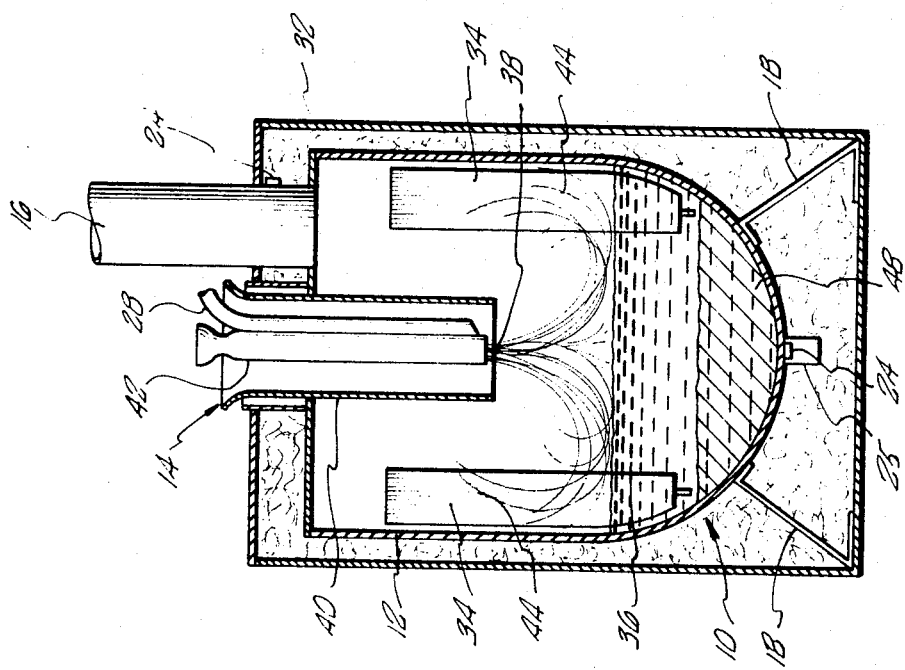

WASTE INCENERATION SYSTEM

BACKGROUND OF THE INVENTION

1. Field of the Invention

The present invention relates to waste incineration systems and, more particularly, an incineration system adapted to dispose of human waste products with no odor and only an ash residue.

2. Description of the Prior Art

In most prior art waste disposal systems, human waste is "mixed" with a substantial volume of water (several gallons) in a conventional toilet and "flushed" into a sewage system. If the system is a public one, the waste materials are combined with other household waste, including additional substantial volumes of water. In some communities the sewage is directed to treatment facilities. Yet in other communities, the sewage is directed into a convenient body of water, thereby adding substantially to the pollution of the environment. Such methods are, among other things, extremely wasteful of otherwise potable water, which itself is an environmental asset in short supply.

Several large scale waste incineration schemes have been proposed, requiring large installations capable of incinerating all wastes at extremely high temperatures. Usually, for economic operation, a "sludge" must be provided, necessitating a concentration of waste material. Such an incinerating system is preferably remotely located as a part of a sewage treatment facility and requires extraordinary amounts of fuel to operate at the high temperatures required to assure odor free waste disposal.

Other schemes have been developed for the disposal of smaller quantities of human waste, such as the apparatus described and shown in U. S. Pat. Nos. 3,458,873 and 3,413,659 to H. J. Nordstedt, et al., or in U.S. Pat. Nos. 3,338,191 and 3,304,559 to D. P. Frankel, et al. Still other commercial devices provide for a combustible receptacle into which wastes are deposited, and subsequently the receptacle and its contents are burned at high temperatures.

A problem with prior art community systems is that they are community systems which require the prior construction of sewer systems. Moreover, huge amounts of heat energy are needed to dispose of mingled wastes in the incinerators of sewage treatment plants. The self-contained, incinerating toilets of the prior art generally require special handling, and the high temperatures to operate them can be hazardous within a dwelling.

In recent years, the development and widespread acceptance of recirculating toilet systems, such as those described and shown in th patents to Palmer, U.S. Pat. Nos. 3,458,049, 3,343,178 and 3,537,590, embodiments of which are commercially available under the trademark "MONOMATIC," has given rise to the development of macerator-grinder pumps which finely comminute the contents of such systems into a slurry which then can be pumped into existing sewage disposal facilities, such as sewers.

It has been observed that the contents of a single recirculating toilet is a manageable quantity of waste (approximately 8 to 10 gallons) which may represent an accumulation and concentration of weeks or even a month of waste products, depending upon the number of users. Typically, a "MONOMATIC" toilet system may be used for 70 to 80 operations before requiring servicing. The contents of such a recirculating system conveniently provide a concentration of waste without the excessive liquid component that would normally accompany such a quantity of waste in a conventional toilet system.

It has been considered desirable to incinerate the contents of a recirculating toilet on a periodic basis, depending upon demand. Since excessive quantities of water are not present, the heat input requirements are substantially more modest than with conventional incinerator systems.

SUMMARY OF THE INVENTION

In accordance with the teaching of the present invention, a novel incinerator assembly is operated whenever a "charge" of waste material has been accumulated. This waste material can be initially processed by a macerator grinder into a slurry that is easily transported through a closed, piping system.

An incinerator vessel is provided which, in a preferred embodiment, is insulated and has a substantially cylindrical shape with a dished inner bottom. A plurality of vertical conductive fins are disposed about the inner periphery of the vessel and extend to the base of the cylinder. The fins conduct heat from the flame area above the liquid level into the liquid. An upper cover is provided with an eccentrically locatdd exhaust vent. A central burner assembly is provided with an inductor tube assembly to assure an adequate supply of combustion air. The volume of the vessel is such to accomodate a single charge of waste in about one-fourth or less of the vessel.

An electrically held fuel valve utilizes the temperature differential which is represented by the electrical potential differential of a pair of thermocouples to hold the valve open. A first thermocouple is placed on or near the exhaust flue or stack, and a second thermocouple is placed at or near the bottom of the vessel or hot pot. So long as a sufficient temperature differential exists between the exhaust stack area and the pot bottom, the fuel supply will be permitted to flow to the burner.

When the temperature at the pot bottom approaches the temperature at the flue, which will occur after the liquid has been vaporized, and following the incineration of the solid waste residue, the resulting thermocouple voltage differential will be insufficient to hold fuel valve open. With closure of the fuel valve, the incineration cycle is complete.

Obviously, and as has been employed in prior art systems, the most efficient method of incinerating the charge is to apply heat energy to the slurry as rapidly as possible. The slurry then boils, and the liquid portion evaporates. The continued application of heat then incinerates the solid wastes. This technique, however, tends to generate both unpleasant odors and smoke. It has heretofore been necessary to provide an "afterburner" in the exhaust stack to eliminate such odors and smoke. Accordingly, such a system becomes quite complex to deosgn and control.

According to the present invention, therefore, only the surface of the liquid slurry is kept in contact with the flame cloud or "plasma" that is the source of heat energy. The volume of the vessel is adequate to provide a substantial high temperature, residence time, sufficient to consume completely all combustible vapors released from the slurry, thereby substantially eliminating any smoke or odors.

This process can be denominated as "controlled inefficiency" since a more efficient utilization of the heat energy, as described earlier, dictates the application of heat directly to the slurry container with the smallest heat loss. Unfortunately, such a technique necessarily requires boiling the liquid in the vessel, which, while resulting in a faster evaporation of the liquid fraction, also generates objectionable odors and smoke which would have to be eliminated by other means.

A readily available, high-energy fuel, such as butane or propane, is utilized in a preferred embodiment. The flame occupies a substantial interior volume of the container and will be referred to hereinafter as a plasma. The plasma impinges not only on the surface of the liquid, but also on the fins. It is believed that the application of the flame to the surface causes a "boiling" that is limited to the first few millimeters of depth of the liquid. The fins are helpful in putting additional heat into the liquid at the surface through conduction. The vaporization process tends to limit the surface temperature to 212° F under normal conditions of pressure and maintains the major portion of the waste slurry at a much lower temperature, approaching ambient.

In the preferred embodiment, the temperature of the flame plasma is in excess of 1,600° F, and the exhaust temperature at the flue is approximately 1,000° F, thereby discouraging the production of objectionable odors. Since the flame impinges upon the liquid surface, the hot gas molecules "break up" the surface and cause vaporization of the liquid. The liberated vapors pass through the flame plasma and are consumed. The exhaust products, because of the long dwell time in the flame plasma, are virtually all $CO_2$ and $H_2O$.

When the vaporization of liquid has been completed, the surface temperature of the remaining waste products increases to the combustion temperature, at which the solid wastes begin to burn. This phase of combustion proceeds rapidly, during which the temperature sensed by the lower thermocouple approaches that of the exhaust temperature sensing thermocouple. When the voltage difference between the two thermocouples is inadequate to maintain the valve open, the valve will close, shutting off the fuel supply and terminating the disposal cycle. A further novel feature of this control method is the fact that the cycle is self-terminating upon completion of incineration regardless of quantity or quality of the slurry introduced. The final residue is a clean, odorless, sanitary ash which can be periodically retrieved and disposed of.

The novel features which are believes to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 2 is a side sectional view of the incinerator system of FIG. 1;

FIG. 4 is a partial side sectional view of the incinerator system of FIG. 1 in operation; and FIG. 5 is a partial side sectional view of the incinerator system of FIG. 4 toward the end of an operation.

DESCRIPTION OF THE PREFERRED EMBODIMENTS

Figure 1:
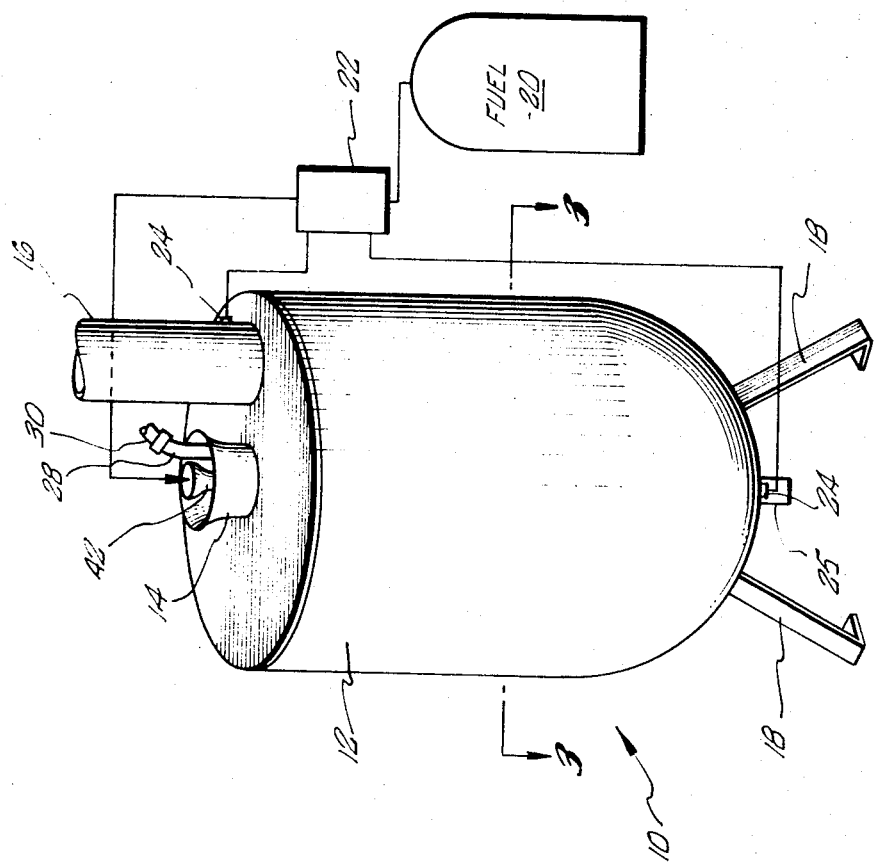
FIG. 1 is a perspective view of an incinerator system according to the present invention.

Turning first to FIG. 1, there is shown in perspective view a waste incineration system 10 according to the present invention. The system 10 includes, as the component elements thereof, an incinerator pot 12, a burner assembly 14, an exhaust stack 16, a base or stand 18, and a fuel supply 20, which may be LPG, propane, or some other readily available fuel that can produce a hot flame.

An electrically controlled valve 22, receives inputs from temperature sensors 24 located at the exhaust stack 16 and at the base of the pot 12 adjustably mounted on a head conductor 25. By varying the placement of the sensor 24 on the conductor 25, a suitable time lag of desired duration can be introduced into the system. This time lag allows sufficient temperature to be reached at the very bottom of the pot 12 to assure complete incineration of any remaining solids before shuting off the fuel to burner assembly 14. Waste products to be incinerated are introduced via tube 28 which is designed so as not to subject the supply hose 30 to the intense heat of the interior of the pot 12 during operation.

In typical operation, the contents of a recirculating toilet, which would be approximately 8½ gallons of a slurry of waste products and water, is introduced into the pot 12 through the hose 30 and the tube 28. The interior volume of the pot 12 is such that the approximate 8 to 9 gallon initial charge would occupy something less than one-fourth of the interior volume of the pot 12.

When it is desired to operate the incinerator, a manual override (not shown) on the gas valve 22 is operated, and the fuel is ignited at the burner. Alternatively, a fully automatic system could be provided. The burner is permitted to operate for approximately a minute to 2 minutes, similar to the operation required to light gas-fired hot water heaters, until the interior temperature of the pot 12 and of the exhaust stack 16, as sensed by the thermocouple 24, exhibits a substantial increase in differential temperature somewhat in excess of 300° F, at which time the two thermocouples 24 will generate a voltage differential that is sufficient to maintain the gas valve 22 in the open configuration, whereby fuel is supplied to the burner assembly 14 so long as a minimum differential temperature is exceeded.

As the slurry in the pot is vaporized only at the surface, the temperature below the surface remains substantially below boiling, since the heat required to vaporize is partially drawn from the liquid, and there is no convection to distribute the heat throughout the liquid. The temperature in the interior of the liquid tends to remain approximately that of the ambient exterior.

When the liquid portion of the waste slurry is vaporized, the temperature at the base of the pot 12 begins to rise and, after a time lag determined by the position of the sensor 24 on the conductor, the detected temperature begins to rise, as well. As the ignition temperature of the remaining solid waste materials has been reached, these will be incinerated at the combustion temperature. After the solid combustible waste products have been consumed, the temperature at the bottom of the pot 12 rises to approach the temperature at the exhaust flue 16 after an interval adequate to assure incineration of all solid wastes.

The temperature at the bottom of the pot approaches the temperature of the flue, and the thermocouples no longer supply sufficient voltage to hold the gas valve 22 in the "on" condition. The valve then closes, signalling completion of the incineration cycle, and shuts off the fuel supply to the burner.

It is desirable to permit the pot 12 to return to an essentially ambient temperature before recharging the pot 12 with a waste slurry, since an elevated temperature prior to ignition of the burner might result in the generation of noxious or unpleasant fumes which would be discharged into the atmosphere.

Turning next to FIG. 2, there is shown in a side-sectional view, the waste incineration system 10 of a preferred embodiment of the present invention as it would be operating with a charge of slurry and with the burner in operation. As will be noted in FIG. 2, an external protective jacket 32 is provided in substantially cylindrical form, to partially insulate the environment from the elevated temperatures of the incinerator pot 12 and to minimize the hazards of such a hot body. A plurality of heat conducting ribs or fins 34 are provided about the interior periphery of the pot 12. The level of liquid waste slurry 36 at the initial charge occupies something less than one-fourth of the interior volume of the pot 12.

The burner assembly 14 includes a burner orifice 38 and an air intake tube 40 which is concentric with the burner pipe 42. The intake tube 40 draws additional air for combustion into the interior of the pot 12.

Sufficient fuel and air are supplied to the interior of the pot 12 to substantially fill the interior volume above the liquid with an extended flame plasma 44 pattern. The base of the pot 12, shown as a vessel with a curved bottom facilitates the uniform incineration of the solid wastes remaining after the liquid portion has boiled off. The rounded surface avoids problems generally associated with "corner."

Figure 3:
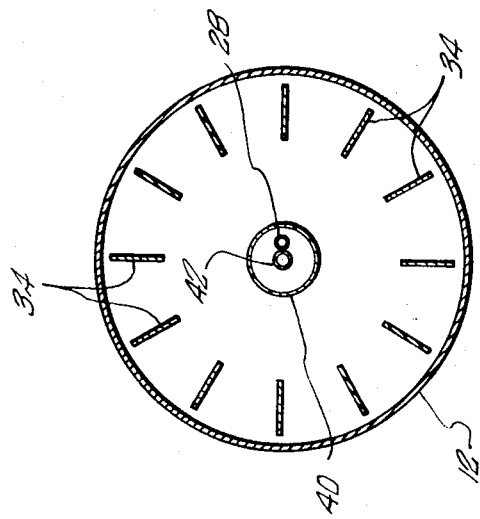
FIG. 3 is a top sectional view of the incinerator system of FIG. 2.

Turning next to FIG. 3, there is shown a top view of the interior of the lower portion of the pot 12, showing in some detail the location and placement of the several heat conducting fins 34 which are equally spaced around the periphery of the pot 12. Centrally located within the pot is the burner 42 surrounded by the air intake 40.

In FIG. 4, there is shown a side-sectional portion of the pot 12 in operation, wherein a charge of waste slurry 36 is being heated by the flame plasma 44 which impinges upon the surface 46 of the liquified slurry and upon the conductive fins 34.

The velocity of the air-fuel mixture, which is burned to become the plasma 44, is sufficient to agitate the liquid surface 46, providing a slight increase of surface area for the vaporization of the liquid component of the slurry 36. Further, the flame plasma 44 impinges upon the heat conductive fins 34. Additional heat is thereby supplied to the mixture by conduction through the fins 34 which, for the most part, contributes to a localized boiling at the surface 46. It is clear, however, that most of the heat energy is applied to the surface 46 from the incandescrnt gas-air mixture that is the plasma 44.

As the liquid component of the slurry 36 evaporates from the surface 46, the vapors thus liberated travel through the plasma 44 for a substantial period of time en route to the exhaust stack 16, as is hown in FIG. 1. The dwell time of each incremental volume of vapor in the flame plasma 44 is sufficient to ignite and incinerate any combustible components that may have been liberated from the slurry 36. As a result, only water vapor and $CO_2$ exit from the system.

As the process continues, more and more of the liquid portion of the slurry 36 is evaporated. The remainder becomes more and more concentrated until only the solid components remain. This portion of the operation is best described in connection with FIG. 5.

Illustrated in FIG. 5 is a side-sectional view of the base of the pot 12, showing the solid waste 48 remaining after the liquid portion of the slurry 36 has been evaporated. The flame plasma 44 continues to impinge upon the surface of the solid waste 48. The temperature rapidly elevates until the temperature of ignition is reached. The solid waste matter is completely consumed in the plasma and is reduced to a noncombustible ash residue. The temperature remains at the temperature of combustion during this phase of the process. The combustion products pass through the flame plasma 44 and are completely consumed, leaving only water vapor and carbon dioxide to exit the flue.

After the solid waste 48 is consumed, the temperature at the base of the pot 12 increases. The temperature-sensitive thermocouple 24 positioned on the heat conductor 25 at the base of the pot signals the rising temperature to the gas control valve 22 with a time lag. As the temperature of the pot 12 approaches to within 100° of so of the temperature at the exhaust stack, which is nominally 1,000° F, the voltage difference between the two thermocouples is insufficient to maintain the gas control valve 22 in its open condition, and the fuel supply is cut off, thereby extinguishing the flame.

In alternative embodiments, it is contemplated that the control system in response to temperature differentials, could control a substantially batch process whereby a larger volume of wastes could be concentrated and accumulated prior to the incineration of the solid portion. In such an embodiment, whenever the temperature near the base of the pot exceeded 212° F, a remote valve could be operated to add additional liquified slurry to the pot. A plurality of recirculating toilet units could be sequentially emptied into the incinerator during a single period of substantially continuous operation.

When the fluids had been evaporated and no further slurry remained to be processed, the solid portion of the wastes would then be incinerated to ash after the temperature differential between the bottom and the exhaust flue is reduced to the preset limit, approximately 100° F, the differential thermocouple voltage would no longer hold the fuel valve 22 open, and the fuel supply would be cut off and the incineration cycle terminated.

Periodically, the incinerator pot 12 would require cleaning to remove the accumulated ash and/or solid residual waste. To the extent that such waste included reclaimable materials, they could be recycled into the economy. Further, if deemed desirable, the exhaust vapors could be directed to a heat exchanger and/or condensing system so that some use might be made of the heat energy in the exhaust gases and so that the water portion that would otherwise be lost to the atmosphere might be reclaimed.

Thus there has been shown and described a waste incineration system for handling human wastes. The system is most economical and feasible when used in conjunction with a recirculating toilet system that tends to concentrate human wastes with only a limited amount of water. In alternative embodiments, the system of the present invention incinerates the contents of a recirculating toilet system in a single, continuous, two-step operation.

A flame "plasma" is provided to the surface of a mixture of waste products and water. The heat of the plasma causes surface "boiling" to evaporate the liquid portion of the mixture without a "boiling" of the entire mixture. When the liquid portion has "boiled off," the remaining solid waste is incinerated by the flame plasma. After incineration has been completed, the increase in temperature of the container is sensed, and when the temperature difference between the container and the exhaust flue falls below a present limit, the fuel supply is cut off, terminating the operation.

Alternatively, the temperature difference can be used to control the provision of additional volumes of liquid-waste mixtures so that the liquid fractions can be evaporated off in a repetitive fashion until the supply of liquid-waste mixture is exhausted. At this point, the temperature in the container is then permitted to reach the ignition temperature of the solid wastes.

When these have ignited and have been consumed, the temperature differential between the exhaust and the container then falls below the preset limit and the fuel supply is cut off, extinguishing the flame and terminating the operation.

The end products of the process of the present invention are water vapor and carbon dioxide, which exit from the exhaust. There is also an odorless, clean ash residue remaining in the container, which can be periodically removed.

What is claimed as new is:

1. A method of incinerating solid waste that comprises the steps of:
   a. forming a slurry from a mixture of solid waste and a liquid;
   b. slowly vaporizing only the liquid at the surface of the slurry until all the liquid is removed, by applying heat to the surface thereof without boiling the slurry mixture; and
   c. burning the remaining dry solid waste.

2. A method according to claim 1 in which an open flame is directed to the surface of the slurry to vaporize only the surface liquid.

3. A method according to claim 2 in which the open flame has a temperature of at least 1,000° F.

4. A method according to claim 2 in which the open flame generates a "plasma" having a temperature of at least 900° F.

5. A method according to claim 2 in which the flame is directed at the most central portion of the surface of the slurry.

6. A method according to claim 1 in which heat is applied simultaneously by radiation to the surface of the slurry and by convection to the slurry mixture.

7. A method for incinerating waste that comprises the steps of:

a. applying a slurry of solid waste and liquid to form a reservoir of slurry material;
   b. directing an open flame of substantial volume to the surface of the slurry material;
   c. vaporizing the liquid at the surface of the reservoir until all liquid is removed;
   d. maintaining the flame at a high temperature for removing objectionable odors and smoke; and
   e. applying the flame directly to the solid waste to effect combustion.

8. A method according to claim 7 in which the efficiency of incineration is enhanced by locating the reservoir in a cylindrical container having a dished bottom.

9. A method according to claim 8 in which the open flame inpinges on the complete surface of the slurry material by having a flame intensity sufficient to fill the interior of the cylindrical container.

10. A method according to claim 8 in with the open flame preheats the slurry mixture by conduction through conducting elements at the same time the open flame vaporizes the surface liquid.

11. Apparatus for incinerating waste materials comprising in combination:
    a walled container for holding a slurry mixture comprised of solid waste and a liquid;
    a burner assembly connected to said container for generating an open flame within the walled container and positioned to direct said flame to the surface of said slurry mixture for vaporizing the liquid from only the surface of the slurry mixture and to incinerate the remaining solid waste material after the liquid portion is vaporized; and
    control means responsive to the differential between the temperature of the waste gases exhausting from the container and the temperature of the slurry mixture for controlling said flame generated by said burner assembly.

12. A combination according to claim 11 in which said open flame is forced to impinge directly on the surface of the slurry mixture.

13. A combination according to claim 12 in which the temperature of said open flame is at least 1,000° F, and the burning gases around the flame is at least 900° F.

14. A combination according to claim 11 in which said walled container has a cylindrical shape with a dished bottom for holding the slurry mixture, and including conducting means within said walled container for transmitting heat generated by the flame into the slurry mixture.

15. A combination according to claim 11 which further includes fin members installed in said container for conducting heat from said flame into the slurry mixture by condutction.

16. A combination according to claim 11 in which said burner assembly is centrally located within the walled container over the slurry mixture and in which said burner is fed by a fuel source external to the walled container.

17. A combination according to claim 16 which includes fuel valve control means adapted to maintain a flow of fuel in the presence of a temperature difference exceeding a predetermined magnitude between the exhaust gases and the slurry mixture, and in which the fuel flow is stopped when the temperature difference is less than the predetermined magnitude.

18. The apparatus of claim 11 wherein said control means include a heat conductive element fixed to the bottom of said walled container, and temperature sensing means for generating a signal corresponding to and representative of temperature adjustably mounted to said conductive element for interposing a time lag between the time that the interior of said walled container approaches a temperature magnitude and said sensing means detect and signal that temperature.

19. In combination:
a walled container for holding a mixture of human wastes and liquid;
burner assembly adapted to generate an open flame having a temperature of at least 1,000° F is positioned centrally over said mixture and which is adapted to fill substantially the interior volume of said walled container;
a source of fuel coupled to said burner assembly;
detecting means for determining the temperature of gases exhausting from the container and the temperature of the mixture; and
fuel control means coupled to said burner assembly and controlled by said detector means for stopping the flow of fuel as the temperature difference falls below a preset magnitude,
whereby the liquid portion of the mixture is vaporized and the remaining solid portion is incinerated, said fuel flow being stopped when the solid portion of the mixture is incinerated and the temperature of the container approaches the temperature of the exhaust gases.

20. The combination of claim 19 wherein said detecting means include a heat conducting element extending from the base of said walled container and temperature sensing means adjustably mounted on said element for interposing a desired time delay between the time that the base of said container reaches a predetermined temperature and the time that the same predetermined temperature is detected by said sensing means on said element.

* * * * *

UNITED STATES PATENT OFFICE
CERTIFICATE OF CORRECTION

Patent No. 3,741,134                    Dated June 26, 1973

Inventor(s) George C. Roberts et al.

It is certified that error appears in the above-identified patent and that said Letters Patent are hereby corrected as shown below:

In the title "inceneration" should read --incineration--.

Col. 2, line 31, "accomodate" should read --accommodate--.

Signed and sealed this 1st day of January 1974.

(SEAL)
Attest:

EDWARD M. FLETCHER, JR.                RENE D. TEGTMEYER
Attesting Officer                      Acting Commissioner of Patents